US010901585B2

(12) United States Patent
Singh et al.

(10) Patent No.: US 10,901,585 B2
(45) Date of Patent: Jan. 26, 2021

(54) ITERATIVE DETECTION OF FORMS-USAGE PATTERNS

(71) Applicant: Adobe Inc., San Jose, CA (US)

(72) Inventors: Harpreet Singh, Chandigarh (IN); Arvind Heda, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/579,788

(22) Filed: Sep. 23, 2019

(65) Prior Publication Data

US 2020/0019299 A1    Jan. 16, 2020

Related U.S. Application Data

(63) Continuation of application No. 14/519,083, filed on Oct. 20, 2014, now Pat. No. 10,452,239.

(51) Int. Cl.
*G06F 17/20* (2006.01)
*G06F 3/0484* (2013.01)
*G06F 11/36* (2006.01)

(52) U.S. Cl.
CPC ...... *G06F 3/04842* (2013.01); *G06F 11/3604* (2013.01)

(58) Field of Classification Search
CPC ............... G06F 3/04842; G06F 11/3604
See application file for complete search history.

(56) References Cited

U.S. PATENT DOCUMENTS

| 10,452,239 B2 | 10/2019 | Singh et al. | |
| 10,614,099 B2 * | 4/2020 | Eigner | G06F 40/174 |
| 10,657,200 B2 * | 5/2020 | Gaither | G06F 40/174 |
| 2005/0097008 A1 * | 5/2005 | Ehring | G06Q 30/0639 |
| | | | 715/205 |
| 2007/0186283 A1 | 8/2007 | Brumbaugh et al. | |
| 2008/0215976 A1 * | 9/2008 | Bierner | G06F 40/174 |
| | | | 715/708 |
| 2009/0183104 A1 * | 7/2009 | Dotson | G06F 16/904 |
| | | | 715/771 |

(Continued)

OTHER PUBLICATIONS

"Final Office Action", U.S. Appl. No. 14/519,083, dated Apr. 19, 2018, 28 pages.

(Continued)

*Primary Examiner* — Shahid K Khan

(74) *Attorney, Agent, or Firm* — SBMC

(57) ABSTRACT

In embodiments of iterative detection of forms-usage patterns, a data analytics application can be implemented to receive analytics data associated with one or more data forms that each include data-entry fields displayed in a user interface, where the data-entry fields are designed for data entry, such as by a user of a computing device. The data analytics application can determine data-entry problems with the data-entry fields of the data forms based on the analytics data, as well as identify a critical data-entry problem with a data-entry field of a data form, the critical data-entry problem being identified as one of the determined data-entry problems. A distribution scale can be generated and displayed to depict the determined data-entry problems along with the critical data-entry problem. The data form can also be displayed in a preview mode with the analytics data displayed on the data form itself to indicate the data-entry problems.

20 Claims, 5 Drawing Sheets

(56) References Cited

U.S. PATENT DOCUMENTS

| | | | |
|---|---|---|---|
| 2011/0145738 A1 | 6/2011 | Laugwitz et al. | |
| 2012/0191764 A1 | 7/2012 | Leibu et al. | |
| 2013/0263023 A1* | 10/2013 | Goodwin | G06F 16/958 |
| | | | 715/760 |
| 2014/0019492 A1 | 1/2014 | Woods et al. | |
| 2014/0304034 A1 | 10/2014 | Mitchell et al. | |
| 2016/0110280 A1 | 4/2016 | Singh et al. | |

OTHER PUBLICATIONS

"Non-Final Office Action", U.S. Appl. No. 14/519,083, dated Jan. 7, 2019, 30 pages.

"Non-Final Office Action", U.S. Appl. No. 14/519,083, dated Jul. 14, 2017, 16 pages.

"Notice of Allowance", U.S. Appl. No. 14/519,083, dated Jun. 12, 2019, 14 pages.

New, "Tracking online form usage: Google Analytics vs. Fromisimo", Retrieved at: https://web.archive.org/web/20130725074046/https://www.formisimo.com/blog/tracking-online-form-usage-google-analytics-vs-form isimo/—on Dec. 31, 2018, Jul. 3, 2013, 4 pages.

* cited by examiner

118

| Detailed Report |
|---|

Govsite.gov
Home   All Forms   My Forms

① General Information   ② Service Information   ③ Certification

◄ Previous                                    Next ►

212   204
                                                        402

Service Information ⓘ   208

VA File Number   [        ] ⓘ   (1137)

Service Serial Number   [        ] ⓘ   (543)

210

Location of VA Regional Office   [        ]

Branch of Service   ○ Army  ○ Air Force  ○ Marine Corps
                    ○ Navy  ○ Coast Guard  ○ Other

[        ]

Method of Separation from the Service   ○ Discharged  ○ Retired (873)

132

| Help Distribution (per thousand renditions)   □ ✕ |
|---|

1 ─┼─── [green] ─── [yellow] ─── [orange] ─── [red] ─●─ 304

302

VA File Number  1137

ITERATIVE DETECTION OF FORMS-USAGE PATTERNS

CLAIM OF PRIORITY

This application is a continuation of and claims priority to U.S. patent application Ser. No. 14/519,083, filed Oct. 20, 2014, entitled "Iterative Detection of Forms-Usage Patterns", the entire disclosure of which is hereby incorporated by reference herein in its entirety.

BACKGROUND

On-line data forms can be designed for mobile device and desktop applications, and generally include data-entry fields that are displayed for user input of data and information. Typically, a user with a computing device, such as a mobile phone, tablet device, or desktop computer, can access an on-line data form for display, such as a government site form, an insurance company form, a business form, a retail site form, or any other type of form that has been created by a forms developer with data-entry fields for user input. The forms developers then collect anonymous analytics data that indicates how well a particular data form is designed and how well the data form performs for user input.

Currently, analytics integration implementations collect generic data in the form of Web page visits, application interface views, events, exceptions, and timing durations. For example, current analytics implementations can track the number of times that a particular Web page is visited, but may not track the number of times that a particular section or area of the Web page is visited. Similarly, the current analytics implementations can track the number of times that a particular application interface is viewed, but not the features of the application interface that may be accessed by the users that view the application interface.

Current analytics data may also include other tracked generic data, such as events related to a page open, close, or abandon, and the exceptions may include page aborts or abandons. The timing durations are also generic analytics data that can be collected simply for the time that a page is displayed. This generic, collected analytics data can then be displayed in user interface representations for evaluation by a forms developer, such as in bar graphs or comparison graphs that broadly represent the collected generic analytics data. However, the displayed data representations are generally restricted to simple comparisons of all of the collected generic data. The analytics data represents overall Web page visits and does not lend itself to the details of particular Web page sections or data-entry fields, which are important for the analysis of the data forms. Generally, no two forms are identical and there is no simple way to compare the design and data-entry fields of multiple forms, except from the basic information, such as total renditions (when a form is generated for display), drafts (when the form is filled-in), and submissions (when the filled-in form is submitted).

Typical reports that are displayed as the data representations of the collected generic data generally include bar graphs and comparison graphs that the forms developers then have to evaluate to understand data form design and performance. There is not an intuitive way to identify whether there are user input problems with a data-entry field in a data form, or to verify improvement based on the analytics data when the data form is changed or corrected to better facilitate user data entry. Rather, a forms developer has to evaluate and understand the bar graphs and the data representations of the collected generic data to then make changes in a data form, and hope to conclude the expected results from the limited information that is available in the analytics data reports.

SUMMARY

This Summary introduces features and concepts of iterative detection of forms-usage patterns, which is further described below in the Detailed Description and/or shown in the Figures. This Summary should not be considered to describe essential features of the claimed subject matter, nor used to determine or limit the scope of the claimed subject matter.

Iterative detection of forms-usage patterns are described. A data analytics application can be implemented to receive analytics data associated with one or more data forms that each include data-entry fields displayed in a user interface, where the data-entry fields are designed for data entry, such as by a user of a computing device. The analytics data includes metrics associated with the data-entry fields of the data forms, such as a duration of time that a data-entry field is selected for data entry, a number of validation errors with data entries in the data-entry field, a number of times that a help feature associated with the data-entry field is accessed, and/or the duration of time that the data form is displayed for data entry. The analytics data may also include form-level metrics, such as form render, form submit, form draft, form save, and the like. The analytics data can also include computed metrics, such as average fill-in time per form, average visits per submission, and aborts per form.

The data analytics application can then determine data-entry problems with one or more of the data-entry fields of the data forms based on the analytics data, as well as identify a critical data-entry problem with a data-entry field of a data form, where the critical data-entry problem is identified as one of the determined data-entry problems. A distribution scale can then be generated and displayed to depict the determined data-entry problems along with the critical data-entry problem identified on the distribution scale. The distribution scale can also indicate or show a scale or level of criticality of any form issue with respect to other form issues in the total set of data forms that are included for analysis. This indicates the nature and urgency to focus on particular form issues, such as the critical data-entry problems.

A forms analyst can evaluate the distribution scale that identifies the critical data-entry problem, and initiate repairs or changes to the corresponding data-entry field of the data form. The data analytics application can then receive updated analytics data that is associated with the data-entry field of the updated, modified, or repaired data form, where the updated analytics data indicates that the critical data-entry problem with the data-entry field of the data form has been corrected. The distribution scale can be updated based on the updated analytics data, and the updated distribution scale then displayed to depict the determined data-entry problems along with a different critical data-entry problem prominently displayed and identified, where the different critical data-entry problem is associated with a different data-entry field of one or more of the data forms. The distribution scale is recomputed for the different set of data (e.g., the updated analytics data), and the forms analyst can then determine other top-priority and critical-area problems to focus on from the updated distribution scale, which indicates how the data-entry fields in a particular form are distributed across the scale as computed from the global set of all the data forms.

BRIEF DESCRIPTION OF THE DRAWINGS

Embodiments of iterative detection of forms-usage patterns are described with reference to the following Figures. The same numbers may be used throughout to reference like features and components that are shown in the Figures:

FIG. 4 further illustrates the example data form and distribution scale in accordance with embodiments for iterative detection of forms-usage patterns.

DETAILED DESCRIPTION

Figure 1:
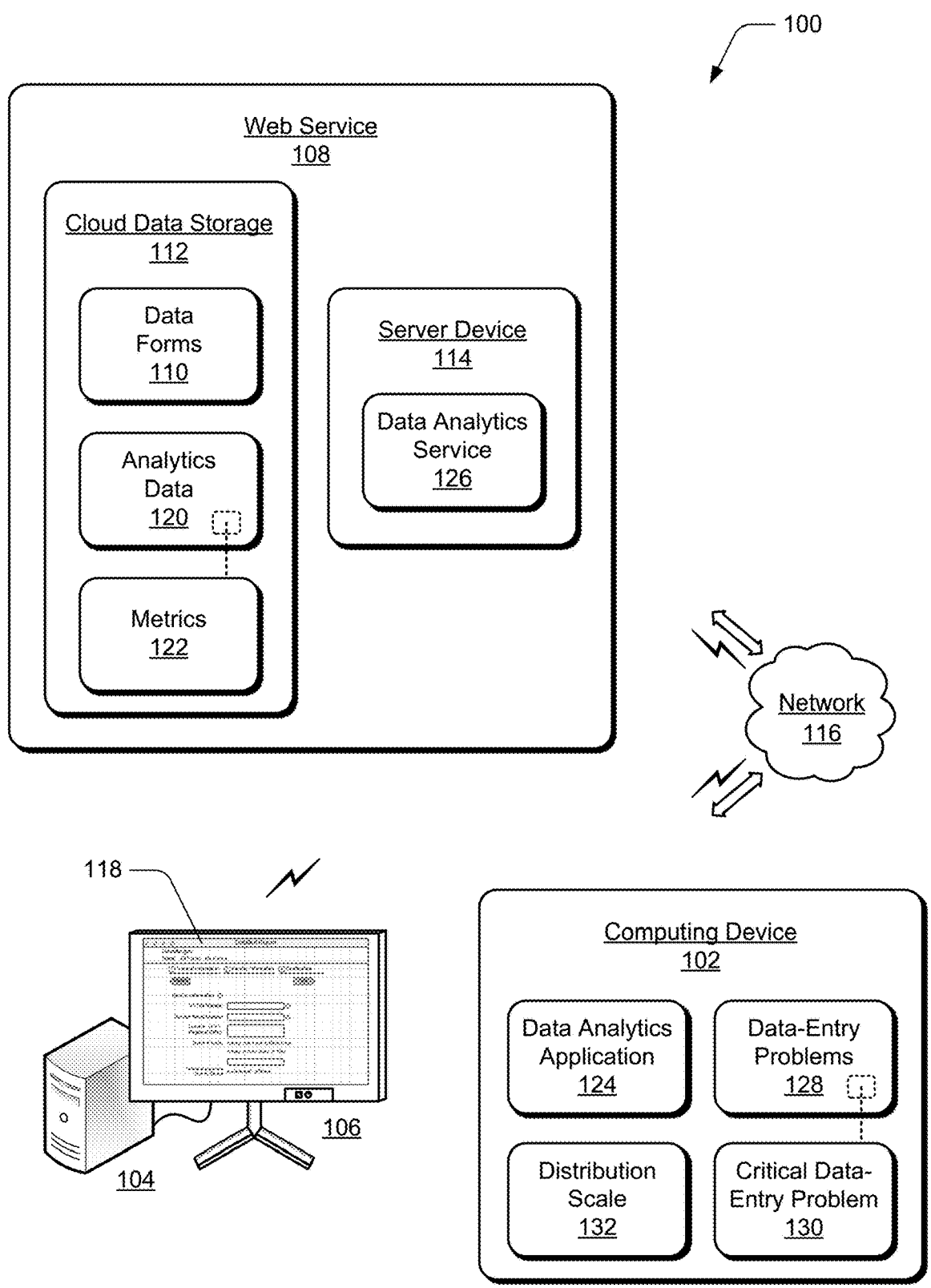
FIG. 1 illustrates an example system in which embodiments for iterative detection of forms-usage patterns can be implemented.

Embodiments for iterative detection of forms-usage patterns are described, and provide that a forms developer can quickly review and identify data-entry problems with various data-entry fields in on-line data forms. A forms developer may create any type of on-line data forms that include data-entry fields designed for user input. The data forms may be designed as a mobile device application form (e.g., a mobile form) for use and display on a portable device, such as a mobile phone or tablet device. Alternatively or in addition, a data form may be designed as a desktop application form, such as for display and use on a desktop or laptop computer. A user at a computing or mobile device can request a data form from any type of Web service, such as a government site form, an insurance company form, a business form, a retail site form, or any other type of form that has been created by a forms developer and posted for public user access.

A data analytics application is implemented to receive anonymous analytics data associated with one or more of the data forms. The analytics data includes metrics that are associated with the data-entry fields of the data forms, and the metrics focus on levels of user interaction with the data forms. The metrics associated with the data-entry fields of the data forms include a duration of time that a data-entry field is selected for data entry, a number of validation errors with data entries in the data-entry field, a number of times that a help feature associated with the data-entry field is accessed, and/or the duration of time that the data form is itself displayed for data entry. The data analytics application can then determine data-entry problems with one or more of the data-entry fields of the data forms based on the analytics data.

A data-entry problem may be any type of problem that users encounter when filling-out a data-entry field in a data form, such as an incorrect format of the data that users input, which can be identified as a validation error of the data that is entered in a data-entry field. A data-entry problem may also be identified as the duration of time that users spend on a data-entry field, such as if the requested data and/or the data format of a data-entry field is unclear or confusing to the users. This can be identified as the data-entry field being selected in a forms interface for data entry for an extended length of time without receiving a user input, or only a partial user input. A data-entry problem can also be attributed to a data-entry field if the users select a help feature that is associated with the data-entry field seeking data input and/or data format help.

The data analytics application can also identify critical data-entry problems with a data-entry field of a data form. A critical data-entry problem is identified as a data-entry problem that occurs often, such as with a data-entry field in a data form. For example, any data-entry problem may be identified as critical due to the recurring nature of problem, such as a large number of data entry errors associated with user data entry in a data-entry field on a form. A distribution scale can then be generated and displayed to depict the determined data-entry problems along with the critical data-entry problem prominently displayed and identified. A critical data-entry problem can be displayed in the distribution scale to indicate the current and most problematic area or data-entry problem.

A forms developer can review and evaluate the distribution scale that identifies the critical data-entry problem, and the forms developer can then initiate repairs or forms changes to the corresponding data-entry field of the corresponding data form (e.g., associated with the critical data-entry problem). Updated analytics data can then be received that indicates the critical data-entry problem with the data-entry field of the data form has been corrected. The improvements made to the data forms leads to the identification of other data-entry problems in other data forms in a recursive manner, thus surfacing other data-entry problems that were earlier shadowed by relatively bigger problems. The process is iterative to highlight the top issues in the data forms with respect to other data forms, and once the initial data-entry issues are resolved, will auto-adjust to the common pattern of usage and again project data-entry fields of the data forms that are performing below the overall average so that a forms developer can take actions to resolve the underlying data-entry field problems.

This becomes a recursive process, where a data form is improved with respect to all of the other data forms. The forms developer can see the progression for a designed data form in the distribution scale over a period of time, where changes made to data-entry fields of a particular data form can be tracked and verified to determine whether the changes resolve the identified data-entry problems. Changes can be made to a data form and the results verified based on updated analytics data depicted in the distribution scale, which thereby improves the usability and effectiveness of the data form. The reporting mode of the distribution scale is dual in nature, providing both quantitative and comparative analytics data.

While features and concepts of iterative detection of forms-usage patterns can be implemented in any number of different devices, systems, networks, environments, and/or configurations, embodiments of iterative detection of forms-usage patterns are described in the context of the following example devices, systems, and methods.

FIG. 1 illustrates an example system 100 in which techniques for iterative detection of forms-usage patterns can be implemented. The example system 100 includes a computing device 102, such as any type of computer, mobile phone, tablet device, media playback device, and other computing, communication, gaming, entertainment, and/or electronic media devices. The computing device 102 can be implemented with various components, such as a processing system and memory, and with any number and combination of differing components as further described with reference to the example device shown in FIG. 6.

The example system 100 also includes a client device 104 that is connected to a display device 106. Although shown as a desktop computer, the client device 104 may be implemented as any type of computing device, such as described with reference to the computing device 102. Further, although only two computing devices are shown in this example (i.e., the computing device 102 and the client device 104), the client device 104 is representative of one or multiple different devices, and identified as a client device simply for convenience of discussion to differentiate between the computing device and the client device.

The example system 100 also includes a Web service 108 that users can access via the computing device 102 and the client device 104. The Web service 108 is representative of any number of cloud-based access sites from which data forms 110 are available from anywhere, such as via the Internet, when posted to the Web, on an intranet site, on an external website, or any other similar location for on-line and/or network-based access. The Web service 108 includes cloud data storage 112 that may be implemented as any suitable memory, memory device, or electronic data storage for network-based data storage, such as to store the data forms 110. The Web service 108 also includes a server device 114 that is representative of one or multiple hardware server devices of the Web service. The cloud data storage 112 and/or the server device 114 may include multiple server devices and applications, and can be implemented with various components, such as a processing system and memory, as well as with any number and combination of differing components as further described with reference to the example device shown in FIG. 6.

Any of the devices, servers, and/or services described herein can communicate via a network 116, such as for data communication between the computing device 102, the client device 104, and the Web service 108. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The data forms 110 represent any type of on-line data forms that include data-entry fields designed for user input, such as data form 118 that is displayed on the display device 106 at the client device 104. Any of the data forms 110 may be designed as a mobile device application form (e.g., a mobile form) for use and display on a portable device, such as a mobile phone or tablet device. Alternatively or in addition, any of the data forms 110 may be designed as a desktop application form, such as for display and use on a desktop or laptop computer. The example data form 118 is also shown and described with reference to FIG. 2, and in this example, the data form 118 is a government form, such as may be associated with the Veteran's Association (VA) and displayed in a user interface (e.g., on the display device 106). A user of the client device 104 may request a data form 110 from any type of Web service 108, such as a government site form, an insurance company form, a business form, a retail site form, or any other type of form that has been created by a forms developer and posted for public user access.

Figures 2, 3:
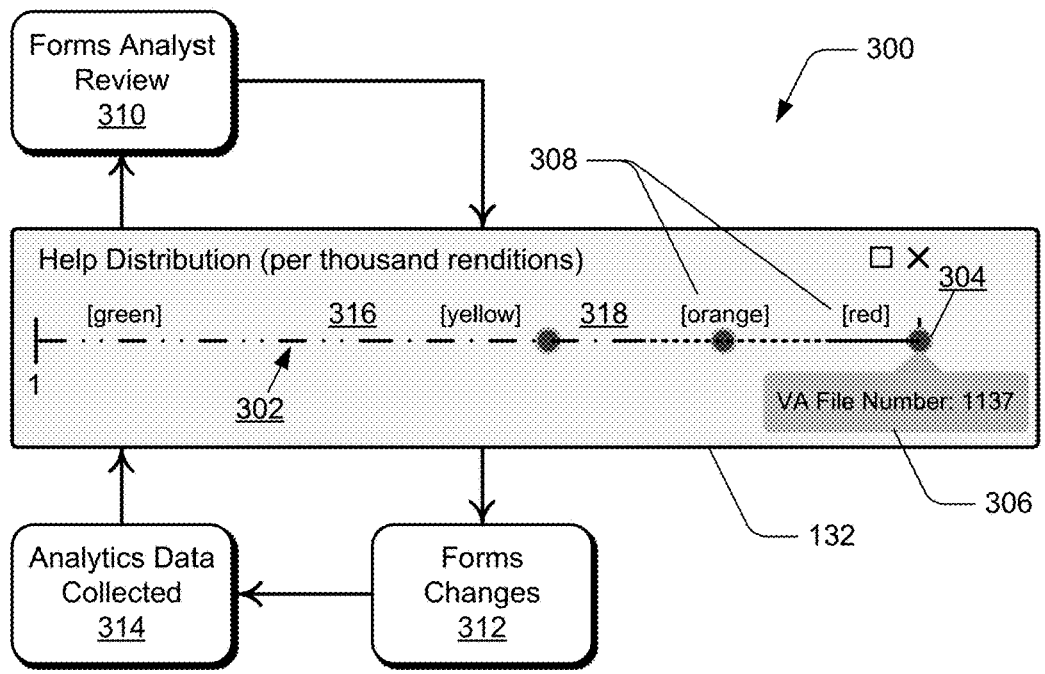
FIG. 2 illustrates an example of a data form with data-entry fields in accordance with embodiments for iterative detection of forms-usage patterns.
FIG. 3 illustrates an example of a distribution scale generated based on analytics data and metrics corresponding to data forms in accordance with embodiments for iterative detection of forms-usage patterns.

FIG. 2 illustrates an example 200 of the on-line data form 118 described with reference to FIG. 1. In this example, the data form 118 is the government form displayed in a user interface (e.g., on the display device 106), and the data form includes data-entry fields 202 that are designed for data entry, such as by a user of the client device 104. The example data form 118 includes a VA file number data-entry field 204 and a selectable help feature 206 that corresponds to the VA file number data-entry field. For example, a user may select the selectable help feature 206 on the data form to receive data input help as it pertains to the VA file number data-entry field, such as for a correct number format. Similarly, the example data form 118 includes a serial number data-entry field 208 and a selectable help feature 210 that corresponds to the serial number data-entry field. The example data form 118 also includes another selectable help feature 212 that corresponds to the overall service information area of the data form, which encompasses the data-entry fields 202.

As described herein in an ongoing example, many users of the on-line data form 118 may find the VA file number data-entry field 204 problematic, such as with determining and/or entering the correct data format of the file number. Many of the form users may enter a VA file number in an incorrect data format, which can be tracked as a validation error of the data that is entered in the data-entry field 204. Alternatively or in addition, many of the form users may cursor or tab to the VA file number data-entry field 204 in the form user interface, but then not enter the number, or delay in entering the number, if the data format or type of the VA file number is unclear or confusing to the users. This extended or prolonged delay in receiving a data entry (e.g., the VA file number) can be tracked as a data-entry field being selected in a forms interface, yet an extended length of time passes without receiving a user input of the data entry. Alternatively or in addition, many of the form users may select the help feature 206 that corresponds to the VA file number data-entry field 204. For example, a user may select the selectable help feature 206 on the data form to receive data input help as it pertains to the VA file number data-entry field, such as for a correct number format. This can be tracked as a data-entry problem attributed to the data-entry field 204 for users seeking data input and/or data format help.

Returning to the discussion of FIG. 1, the Web service 108 collects anonymous analytics data 120 that is associated with one or more of the data forms 110 that each include data-entry fields designed for data entry, such as the example data form 118 that includes the data-entry fields 202 designed for data entry by a user of a computing device on a user interface. The analytics data 120 includes metrics 122 that are associated with the data-entry fields of the data forms, and the metrics focus on levels of user interaction with the data forms. With reference to example data form 118, the metrics 122 of the analytics data 120 can include a duration of time that a data-entry field 204 is selected for data entry, a number of validation errors with data entries in the data-entry field, a number of times that a selectable help feature 206 associated with the data-entry field 204 is accessed, and/or the duration of time that the data form itself is displayed for data entry. The analytics data 120 may also include form-level metrics, such as form render, form submit, form draft, form save, and the like. The analytics data can also include computed metrics, such as average fill-in time per form, average visits per submission, and aborts per form.

The computing device 102 includes a data analytics application 124 that can be implemented as a software application or module, such as executable software instructions (e.g., computer-executable instructions) that are executable with a processing system of the computing device to implement embodiments of iterative detection of forms-usage patterns. The data analytics application 124 can be stored on computer-readable storage media, such as any suitable memory device or electronic data storage implemented by the computing device.

Alternatively or in addition, the Web service 108 implements a data analytics service 126 that can be implemented as a software application or module, such as executable software instructions (e.g., computer-executable instructions) that are executable with a processing system of the server device 114 to implement embodiments of iterative detection of forms-usage patterns. The data analytics service 126 can be stored on computer-readable storage media, such as any suitable memory device or electronic data storage implemented by the Web service. Further, the features and aspects described herein with reference to the data analytics application 124 can be similarly implemented by the data analytics service 126 that is implemented at the Web service 108.

In embodiments, the data analytics application 124 is implemented to receive the analytics data 120 that associated with one or more of the data forms 110 from the Web service 108, such as via the network 116. The data analytics application 124 can then determine data-entry problems 128 with one or more of the data-entry fields 202 of the data forms 110 (e.g., example data form 118) based on the analytics data 120, as well as identify a critical data-entry problem 130 with a data-entry field of a data form based on the determined data-entry problems. The data analytics application 124 can then generate a distribution scale 132 for display to depict the determined data-entry problems 128 along with the critical data-entry problem 130 prominently displayed and identified. An example of the distribution scale 132 is shown and described with reference to FIG. 3. In this example, a data-entry problem 128 is a problem that users encounter when filling-out a data-entry field in a data form approximately 15% to 85% of the time. A data-entry problem that occurs more often and is likely the most problematic shown at the higher end of the distribution scale (e.g., approaching 85%) can be identified as a critical data-entry problem 130 when the form users encounter the problem more than 85% of the time, such as while attempting to fill-in the data-entry field in the data form.

The data analytics application 124 can determine a data-entry problem 128 as any type of problem that users encounter when filling-out a data-entry field in a data form, such as an incorrect format of the data that users input, which is identified as a validation error of the entered data. A data-entry problem may also be identified as the duration of time that users spend on a data-entry field, such as if the requested data and/or the data format of a data-entry field is unclear or confusing to the users. This can be identified as the data-entry field being selected in a forms interface for data entry for an extended length of time without receiving a user input, or only a partial user input. A data-entry problem can also be attributed to a data-entry field if users select the help feature that is associated with the data-entry field seeking data input and/or data format help. These data-entry problems 128 can be determined by the data analytics application 124 based on the analytics data 120 that is associated with one or more of the data forms 110, and received from the Web service 108.

FIG. 3 illustrates an example 300 of the distribution scale 132 that represents the data-entry problems 128 and the critical data-entry problem 130 that corresponds to one or more of the data-entry fields 202 of the data forms 110. In this example, the distribution scale 132 represents the data-entry problems 128 associated with the on-line data form 118 along a continuum 302 that shows a line progressively increasing from a broken or spaced line to a solid line that represents the critical data-entry problem 130 prominently displayed at 304 and identified at 306. The critical data-entry problem 130 is identified at 306 by text "VA File Number: 1137" as a data-entry problem with the VA file number data-entry field 204 of the example data form 118, as shown in FIG. 2. Further, the critical data-entry problem can be prominently displayed at the higher end of the distribution scale 132 (e.g., above approximately 85% of the scale) to indicate that the current problem is likely the most problematic of all the data-entry problems. The critical data-entry problem is also prominently displayed at the higher end of the distribution scale 132 based on the color and line type of the continuum 302, which is displayed as a solid line in a red region of the distribution scale to call a form analyst's attention to the critical data-entry problem with the VA file number data-entry field 204 of the example data form 118.

In this example, the distribution scale 132 indicates a large number of data-entry errors (e.g., "1137" errors) associated with user data entry in the VA file number data-entry field 204 of the example data form 118, as depicted at the far right of the distribution scale 132 (e.g., displayed at 304 and identified at 306). For example, users of the VA form may enter the VA file number in an incorrect format, which is then identified as a validation error of the entered data. The corresponding text "VA File Number: 1137" in the distribution scale 132 may indicate the 1,137 validation errors of the data that is entered by the users in the VA file number data-entry field 204.

The users may also select the VA file number data-entry field 204 on the form interface, but then not enter an input, or only enter a partial input, over a prolonged duration of time, which is identified as the data-entry field being selected for data entry without receiving a user input. The corresponding text "VA File Number: 1137" in the distribution scale 132 may then indicate 1,137 prolonged time durations during which the VA file number data-entry field 204 on the form interface is selected for data entry, but no input is received. Additionally, the users may often need to select the help feature that is associated with the data-entry field seeking data input and/or data format help, which identifies the VA file number data-entry field 204 as being confusing or unclear to the users that are entering data in the form. The corresponding text "VA File Number: 1137" in the distribution scale 132 may then indicate 1,137 instances of form users selecting the help feature 206, seeking assistance to determine the type of data or the data format that is needed as a data entry in the VA file number data-entry field 204 on the form interface.

Although the distribution scale 132 is shown with the continuum 302 as a line (or other graphic representation) that progressively increases to a solid line, in practice the continuum may be represented by transitioning different colors 308, or other differentiating features. For example, the red dot on the distribution scale 132 represents the "hot spot" of the critical data-entry problem 130 that indicates the data-entry errors associated with the user data entry in the file number data-entry field 204 of the example data form 118. Similarly, the orange dot on the distribution scale 132 represents the number of times that the selectable help feature 212 associated with the overall service information area of the example data form 118 was accessed. Similarly, the yellow dot on the distribution scale 132 represents the number of times that the selectable help feature 210 associated with the serial number data-entry field 208 of the example data form 118 was accessed.

A forms developer can review at 310 and evaluate the distribution scale 132 that identifies the critical data-entry problem 130, and the forms developer can initiate repairs or forms changes 312 to the corresponding data-entry field 202 of the data form 110. For example, the forms developer may add an example of the type of number or the number format that is expected as a data input in the VA file number data-entry field 204, or next to the data-entry field, in the example on-line form 118. By displaying an example of the type or number format in the form interface, users will likely enter the VA file number in the correct format, in a shorter time duration, and/or without needing to see assistance by selecting the help feature 206 that corresponds to the VA file number data-entry field 204.

The data analytics application 124 can then receive updated analytics data 314 that is associated with the data-entry field of the updated, modified, or repaired data form, where the updated analytics data indicates that the previous critical data-entry problem with the data-entry field of the data form has been corrected. The distribution scale 132 can then be updated based on the updated analytics data 314, where any additional data-entry problem associated with the VA file number data-entry field 204 may be displayed at the lower end of the distribution scale 132 (e.g., below approximately 15% of the scale) to indicate that any current problem is minimal. The updated distribution scale can be displayed to depict the determined data-entry problems along with a different critical data-entry problem prominently displayed and identified, where the different critical data-entry problem is associated with a different data-entry field of one or more of the data forms.

The improvements made to the data forms 110 leads to the identification of other data-entry problems in other data forms in a recursive manner, thus surfacing other data-entry problems that were earlier shadowed by relatively bigger problems. The process is iterative to highlight the top issues in the data forms 110 with respect to other data forms, and once the initial data-entry issues are resolved, will auto-adjust to the common pattern of usage and again project data-entry fields 202 of the one or more data forms 110 that are performing below the overall average so that a forms developer can take actions to resolve the underlying data-entry field problems. This becomes a recursive process, where a data form 110 can be improved with respect to all of the other data forms, and each time a hot spot is addressed (e.g., changed or repaired), another hot spot that was less critical earlier is identified. This recursive process enables the forms developer to improve all of the data forms 110 for each change made to a data form because each change in a data form leads to overall changes and updates, as indicated by the distribution scale 132.

The forms developer can see the progression for a designed data form 110 in the distribution scale 132 over a period of time, where changes made to data-entry fields of a particular data form can be tracked and verified to determine whether the changes resolve the identified data-entry problems. The analytics data 120 is represented on the distribution scale 132 to provide useful information to the forms developer. Changes can be made to a data form and the results verified based on updated analytics data depicted in the distribution scale, which thereby improves the usability and effectiveness of the data form. This provides both an absolute quantitative feedback, as well as comparative feedback with respect to the data forms 110, and based on the overall average (such as on a user defined set), can highlight the variations falling out of the average usage pattern.

The distribution scale 132 can be generated by the data analytics application 124 based on a technique for scale calculation to depict the hot spots (e.g., the critical data-entry problems 130). The distribution scale enables a forms developer and/or form analyst to identify the hot spots and make changes in the design of a data form to improve the problematic areas, such as with the data-entry fields. A scale definition can be derived from the analytics data 120 across all the data forms 110, and in this example, the distribution scale 132 assumes a tolerance range of 15% to 85%. The distribution scale definition includes a green to yellow transition at 316 for the set of values between the 15% mark and the median of the continuum 302. The distribution scale definition also includes a yellow to orange transition at 318 for the set of values between the median and the 85% mark of the continuum 302. The values that are below the tolerance range 15% mark are identified green, and the values that are above the tolerance range 85% mark are identified red.

Another aspect of the scale definition for the distribution scale 132 is the dynamic nature of the range that is represented by the continuum 302. For example, values from the current analytics data 120 that are within an acceptable range along the continuum might move out of the acceptable range and become hot spots in the distribution scale based on the recursive nature of the implementation. The auto-adjustable nature of the distribution scale 132 makes this process recursive, and the scale calculation assumes a tolerance range of 15% to 85% for the analytics data 120 across all of the data forms 110. Optionally, the tolerance range can be implemented as a user-configurable tolerance range, such as if a form analyst initiates to increase or decrease the tolerance range for feedback evaluation of changes or repairs to the data-entry fields of one or more of the data forms.

The distribution scale 132 is not fixed, but rather is auto-adjusting to compensate and change as the analytics data 120 changes. For example, a current value may be positioned at the median value on the continuum 302 of the distribution scale 132, and may then move towards the 85% range mark if other hot spots have been removed and/or corrected with modifications by a forms developer for the corresponding form. In an example of scale calculation, the analytics data 120 is collected for validation errors over an N number of data-entry fields. The data analytics application 124 is implemented to calculate $X_{ij}$ representing the number of validation errors on a field j per 1000 renditions of a data form i. The analytics data received for analysis is the set S={$X_{ij}$}, where $X_{ij}$ represents the validation error count for data-entry field j/1000 renditions of the data form i. The data analytics application 124 calculates the median for the given analytics data set S, where the data collection and computation is for a specific period of time.

The data analytics application 124 can then select a 70% range around the median which is the tolerance range of 15% to 85% for the analytics data set S, where the lower value is the 15% percentile, the median is the 50% percentile, and the upper value is the 85% percentile. As a result, all of the values in the analytics data set S below the lower 15% value are acceptable and are indicated in the green region of the distribution scale 132. The values in the analytics data set S between the lower 15% value and the median value are indicated in the green-yellow transition region at 316 in the distribution scale. Similarly, the values in the analytics data set S between the median value and the upper 85% value are indicated in the yellow-orange-red transition region at 318 in the distribution scale. Finally, the values in the analytics data set S that are beyond the upper 85% value are indicated in the red region of the distribution scale.

In embodiments, the data analytics application 124 can also be implemented to filter and analyze the analytics data 120 based on one or more rules or heuristics. For example, the analytics data 120 that is represented in the distribution scale 132 can be filtered based on a common metric across the data forms 110, such as by geolocation, and the distribution scale is generated as described above along with applying the geolocation heuristic for data entry in the data forms 110 over a specific geolocation. Further, the distribution scale 132 itself can be enhanced to show data for two or more of the data forms 110, which provides that a forms developer can compare the analytics data for two versions of related data forms, or for different data forms.

FIG. 4 further illustrates an example 400 of the on-line data form 118 that is described with reference to FIG. 1 and shown in FIG. 2. In this example, representations 402 of the analytics data 120 are shown displayed on the data form itself in a preview mode that indicates the determined data-entry problems on the data form. This preview mode enables a forms developer to visualize the sequence of events facing a user while using the form for data entry, and the identified problems can be changed or easily removed to improve the usability of the data form. The analytics data 120 for the defined metrics 122 can be displayed on the data form 118 in the preview mode, and the data-entry problems 128 and/or the critical data-entry problems 130 are shown to correlate with the distribution scale 132 that is also described with reference to FIG. 1 and shown in FIG. 3.

As indicated above, the representations 402 of the analytics data 120 shown displayed on the data form 118 can be shown as varying types of lines (as in this example), shown as different colors, and/or by other differentiating features. Here, the representations shown on the data form correspond to the different line types of the continuum 302 that are shown in the distribution scale. For example, the distribution scale 132 indicates a large number (e.g., 1,173) of data-entry errors associated with user data entry in the file number data-entry field 204 of the example data form 118, as displayed at 304 on the far right of the distribution scale 132. Similarly, the next data-entry problem 128 is indicated in the orange region of the continuum 302 on the distribution scale 132, and represents the number of times (e.g., 873) that the selectable help feature 212 associated with the overall service information area of the example data form 118 was accessed. Similarly, the next data-entry problem 128 is indicated in the yellow region of the continuum 302 on the distribution scale 132, and represents the number of times (e.g., 543) that the selectable help feature 210 associated with the serial number data-entry field 208 of the example data form 118 was accessed.

Example method 500 is described with reference to FIG. 5 in accordance with one or more embodiments of iterative detection of forms-usage patterns. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage memory that is local and/or remote to a computer processing system, and implementations can include software applications, programs, functions, and the like.

Figure 5:
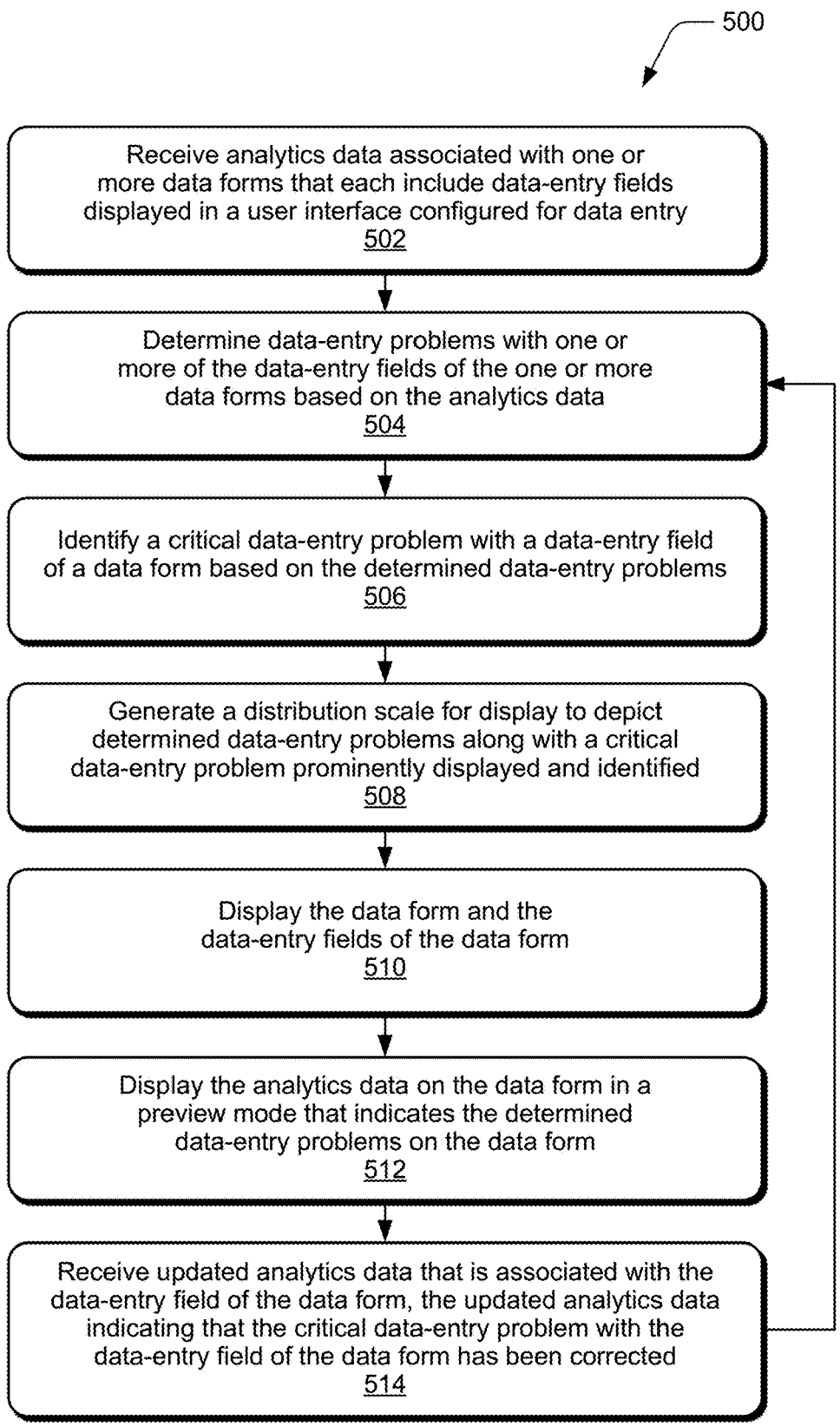
FIG. 5. illustrates an example method of embodiments for iterative detection of forms-usage patterns.

FIG. 5 illustrates example method(s) 500 of iterative detection of forms-usage patterns, and is generally described with reference to the example computing device shown in FIG. 1. The order in which the method is described is not intended to be construed as a limitation, and any number or combination of the method operations can be combined in any order to implement a method, or an alternate method.

At 502, analytics data is received that is associated with one or more data forms that each include data-entry fields displayed in a user interface configured for data entry. For example, the data analytics application 124 that is implemented by the computing device 102 (FIG. 1) receives the analytics data 120 from the Web service 108, and the analytics data 120 is associated with one or more of the data forms 110 that each include data-entry fields 202 displayed in a user interface configured for data entry. The analytics data 110 includes the metrics 122 that are associated with the data-entry fields 202 of the data forms (e.g., example data form 118), such as a duration of time that a data-entry field 204 is selected for data entry, a number of validation errors with data entries in the data-entry field, a number of times that a selectable help feature 206 associated with the data-entry field 204 is accessed, and/or the duration of time that the data form itself is displayed for data entry. The analytics data may also include form-level metrics, such as form render, form submit, form draft, form save, and the like. The analytics data can also include computed metrics, such as average fill-in time per form, average visits per submission, and aborts per form.

At 504, data-entry problems are determined with one or more of the data-entry fields of the one or more data forms based on the analytics data, and at 506, a critical data-entry problem with a data-entry field of a data form is identified based on the determined data-entry problems. For example, the data analytics application 124 determines the data-entry problems 128 with one or more of the data-entry fields 202 of the data forms 110 (e.g., example data form 118) based on the analytics data 120, as well as identifies a critical data-entry problem 130 with a data-entry field of a data form based on the determined data-entry problems.

At 508, a distribution scale is generated for display to depict the determined data-entry problems along with the critical data-entry problem prominently displayed and identified. For example, the data analytics application 124 generates the distribution scale 132 for display to depict the determined data-entry problems 128 along with the critical data-entry problem 130 prominently displayed and identified. The example distribution scale 132 (FIG. 3) represents the data-entry problems 128 along the continuum 302 that shows a line progressively increasing to a solid line that represents the critical data-entry problem 130 prominently displayed at 304 and identified at 306. The distribution scale 132 can also display the determined data-entry problems 128 of the one or more data forms 110 based on a geolocation metric, and/or display the determined data-entry problems as an analytics report of two of the forms on a data comparison scale.

At 510, the data form is displayed with the data-entry fields of the data form, and at 512, the analytics data is displayed on the data form in a preview mode that indicates the determined data-entry problems on the data form. For example, the data analytics application 124 initiates displaying the data form 118 in the preview mode (FIG. 4), which includes representations 402 of the analytics data 120 shown displayed on the data form. The representations of the analytics data 120 shown on the data form 118 correspond to the different line types of the continuum 302 that are shown in the distribution scale 132.

At 514, updated analytics data is received that is associated with the data-entry field of the data form, the updated analytics data indicating that the critical data-entry problem with the data-entry field of the data form has been corrected. For example, the data analytics application 124 receives updated analytics data 314 after a forms developer reviews at 310 and evaluates the distribution scale 132 that identifies the critical data-entry problem 130, and after the forms developer initiates repairs or forms changes 312 to the corresponding data-entry field 202 of the data form 110. The updated analytics data can indicate that the critical data-entry problem with the data-entry field of the data form has been corrected. The method can continue at 504 through 512 as an iterative process by which to make improvements to a data form 110 that then leads to the identification of other data-entry problems in other data forms in a recursive manner. For example, the data analytics application 124 can generate an updated distribution scale for display based on the updated analytics data, where the updated distribution scale depicts the determined data-entry problems along with a different critical data-entry problem prominently displayed and identified, the different critical data-entry problem associated with a different data-entry field of the one or more data forms.

Figure 6:
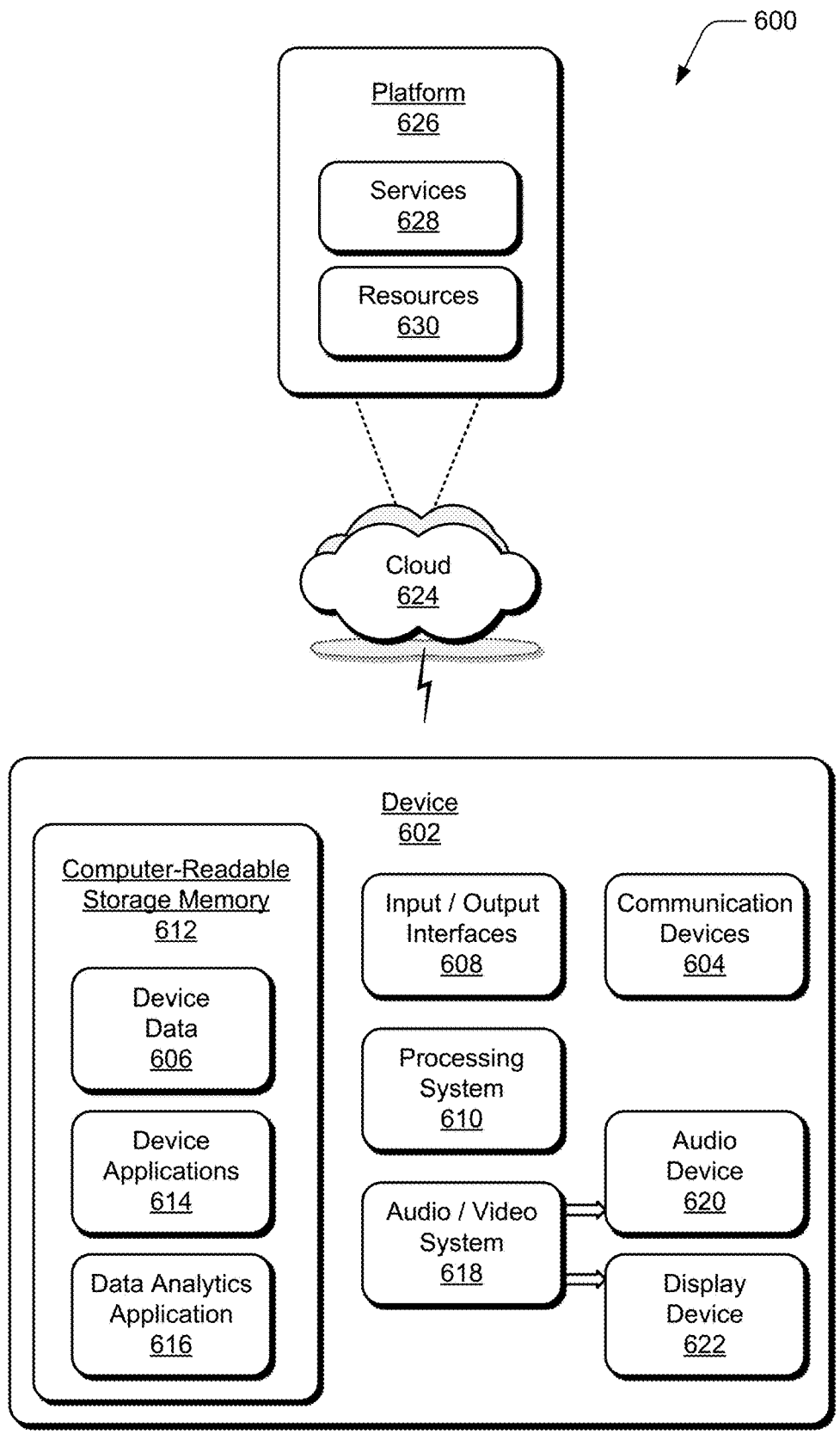
FIG. 6 illustrates an example system with an example device that can implement the embodiments for iterative detection of forms-usage patterns.

FIG. 6 illustrates an example system 600 that includes an example device 602, and in which techniques for iterative detection of forms-usage patterns can be implemented. The example device 602 can be implemented as any of the computing devices and/or services (e.g., server devices) described with reference to the previous FIGS. 1-5, such as any type of computing device, client device, mobile phone, tablet, communication, entertainment, gaming, media playback, and/or other type of device. For example, the computing device 102, the client device 104, the server device 114, and/or the cloud data storage 112 shown in FIG. 1 may be implemented as the example device 602.

The device 602 includes communication devices 604 that enable wired and/or wireless communication of device data 606, such as analytics data that is transferred from one computing device to another, and/or synched between multiple computing devices. The device data can include any type of audio, video, and/or image data, such as application data that is generated by applications executing on the device. The communication devices 604 can also include transceivers for cellular phone communication and/or for network data communication.

The device 602 also includes data input/output (I/O) interfaces 608, such as data ports and data network interfaces that provide connection and/or communication links between the device, data networks, and other devices. The I/O interfaces can be used to couple the device to any type of components, peripherals, and/or accessory devices, such as a digital camera device that may be integrated with device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage memory 612, such as data storage devices that can be accessed by a computing device, and that provide persistent storage of data and executable instructions (e.g., software applications, modules, programs, functions, and the like). Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processing system 610. In this example, the device applications also include a data analytics application 616 that implements techniques for iterative detection of forms-usage patterns, such as when the example device 602 is implemented as the computing device 102 or as the Web service 108 shown in FIG. 1. Examples of the data analytics application 616 include the data analytics application 124 that is implemented by the computing device 102 and/or the device application service 126 that is implemented by the server device 114 of the Web service 108, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for iterative detection of forms-usage patterns may be implemented in a distributed system, such as over a "cloud" 624 in a platform 626. The cloud 624 includes and/or is representative of the platform 626 for services 628 and/or resources 630. For example, the services 628 may include the Web service 108 and the data analytics service 126 that is described with reference to FIGS. 1-5. Additionally, the resources 630 may include the data forms 110 and the corresponding analytics data 120.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of iterative detection of forms-usage patterns have been described in language specific to features and/or methods, the appended claims are not necessarily limited to the specific features or methods described. Rather, the specific features and methods are disclosed as example implementations of iterative detection of forms-usage patterns.

The invention claimed is:

1. A method, comprising:
    receiving analytics data describing user interactions with data-entry fields of a data form, the analytics data comprising metrics associated with the data-entry fields of the data form, the metrics including at least a number of validation errors associated with respective data-entry fields of the data form;
    determining data-entry problems with data-entry fields of the data form based on the analytics data;
    identifying one of the data-entry problems as a critical data-entry problem associated with a respective data-entry field based on the analytics data;
    displaying a distribution scale that depicts the determined data-entry problems along with the critical data-entry problem, the determined data-entry problems arranged along the distribution scale based at least in part on the number of validation errors associated with each of the determined data-entry problems such that the critical data-entry problem is arranged at one end of the distribution scale and less-critical data data-entry problems are arranged at an opposite end of the distribution scale;
    receiving updated analytics data that is associated with the data-entry field of the data form, the updated analytics data being based on changes to the data form; and
    updating the distribution scale based on the updated analytics data for display.

2. The method as recited in claim 1, wherein the metrics further include a duration of time that respective data-entry fields are selected for data entry.

3. The method as recited in claim 1, wherein the metrics further include a number of times that a help feature associated with the respective data-entry fields is accessed.

4. The method as recited in claim 1, wherein the metrics further include a duration of time that the data form is displayed for the data entry.

5. The method as recited in claim 1, further comprising:
    displaying the data form and data-entry fields of the data form; and
    displaying the analytics data on the data form in a preview mode that indicates the determined data-entry problems on the data form.

6. The method as recited in claim 1, wherein the updated analytics data indicates that the critical data-entry problem with the data-entry field of the data form has been corrected.

7. The method as recited in claim 1, wherein the updated analytics data indicates that the critical data-entry problem with the data-entry field of the data form has been corrected based on a respective number of the validation errors associated with the data entry field being reduced due to the form changes.

8. The method as recited in claim 6, wherein the updating the distribution scale based on the updated analytics data causes a different critical data-entry problem, associated with a different data-entry field of the one or more data forms, to replace the critical data-entry problem that has been corrected.

9. The method as recited in claim 8, wherein the updating the distribution scale based on the updated analytics data causes a different critical data-entry problem, associated with a different data-entry field of the one or more data forms, to replace the critical data-entry problem that has been corrected comprises moving the critical data-entry problem from the one end of the distribution scale towards the opposite end of the distribution scale.

10. The method as recited in claim 9, wherein the updating the distribution scale by moving the critical-data entry problem towards the opposite end of the distribution scale indicates that the critical data-entry problem is less critical that the different critical data-entry problem.

11. The method as recited in claim 1, wherein the determined data-entry problems are distributed from the opposite end of the distribution scale indicating increasingly problematic data-entry problems up to the critical data-entry problem.

12. A system, comprising:
    a display device configured to display a distribution scale that depicts data-entry problems with data-entry fields of a data form;
    a processor system to implement a data analytics application that is configured to:
        receive analytics data describing user interactions with the data-entry fields of the data form, the analytics data comprising metrics associated with the data-entry fields of the data form, the metrics including at least a number of validation errors associated with respective data-entry fields of the data form;
        determine data-entry problems with data-entry fields of the data form based on the analytics data;
        identify one of the data-entry problems as a critical data-entry problem associated with a respective data-entry field based on the analytics data;
        display, on the display device, the distribution scale that depicts the determined data-entry problems along with the critical data-entry problem, the determined data-entry problems arranged along the distribution scale based at least in part on the number of validation errors associated with each of the determined data-entry problems such that the critical data-entry problem is arranged at one end of the distribution scale and less-critical data data-entry problems are arranged at an opposite end of the distribution scale;
        receive updated analytics data that is associated with the data-entry field of the data form, the updated analytics data being based on changes to the data form; and
        update the distribution scale based on the updated analytics data for display.

13. The method as recited in claim 12, wherein the metrics further include a duration of time that respective data-entry fields are selected for data entry.

14. The system as recited in claim 12, wherein the data analytics application is configured to filter the analytics data based on one or more pre-defined rules that emphasize one or more of the determined data-entry problems.

15. The system as recited in claim 12, wherein the distribution scale displays the determined data-entry problems as an analytics report for multiple forms on a data comparison scale.

16. The system as recited in claim 12, wherein:
the display device is configured to display the data form and data-entry fields of the data form; and
the data analytics application is configured to initiate a display of the analytics data on the data form in a preview mode that indicates the determined data-entry problems on the data form.

17. One or more computer-readable storage device comprising instructions stored thereon that, responsive to execution by one or more processors, perform operations comprising:
receiving analytics data associated with a data form that includes data-entry fields displayed in a user interface configured for data entry, the analytics data comprising metrics associated with the data-entry fields of the data form, the metrics including at least a number of validation errors associated with respective data-entry fields of the data form;
displaying a distribution scale that is generated based at least in part on the number of validation errors associated with respective data-entry fields of the data form that is included in the analytics data, the distribution scale depicting data-entry problems with one or more of the data-entry fields of the data form, the distribution scale comprising:
a continuum that represents the data-entry problems proximate a first end of the continuum and progressing along the continuum to represent increasingly problematic data-entry problems up to proximate a second end of the continuum; and
an indication of a critical data-entry problem with a data-entry field of the data-entry fields at the second end of the continuum, the critical data-entry problem identified as one of the data entry problems;
receiving updated analytics data that is associated with the data entry problems, the updated analytics data being based on form changes to the data form and the updated analytics data indicating that the critical data-entry problem has been corrected; and
updating the distribution scale based on the updated analytics data for display of another indication of a different critical data-entry problem, associated with a different data-entry field of the data forms, at the second end of the continuum, the different critical data-entry problem replacing the critical data-entry problem that has been corrected.

18. The method as recited in claim 12, wherein the metrics further include:
a duration of time that respective data-entry fields are selected for data entry;
a number of times that a help feature associated with the respective data-entry fields is accessed; and
a duration of time that the data form is displayed for the data entry.

19. The method as recited in claim 12, wherein the metrics further include a number of times that a help feature associated with the respective data-entry fields is accessed.

20. The method as recited in claim 12, wherein the metrics further include a duration of time that the data form is displayed for the data entry.

\* \* \* \* \*